Patented Jan. 18, 1949

2,459,696

UNITED STATES PATENT OFFICE 2,459,696

PROCESS FOR THE PREPARATION OF NORNICOTINE

Paul G. Haines and Abner Eisner, Philadelphia, and Charles F. Woodward, Abington, Pa., assignors to the United States of America as represented by the Secretary of Agriculture No Drawing. Application July 12, 1944, Serial No. 544,618

5 Claims. (Cl. 260—251)

(Granted under the act of March 3, 1883, as amended April 30, 1928; 370 O. G. 757)

This application is made under the Act of March 3, 1883, as amended by the Act of April 30, 1928, and the invention herein described, if patented, may be manufactured and used by or for the Government of the United States of America for governmental purposes without the payment to us of any royalty thereon.

This invention relates to the preparation of nornicotine, and more particularly to a process for the production of nornicotine by the reaction of myosmine with hydrogen.

The alkaloid, nornicotine, occurs naturally as the laevo (l-) enantiomorph in various tobacco types and the highest concentrations of this nitrogenous base are often found in tobaccos containing small quantities of nicotine. The natural occurrence of the optical antipode, di-nornicotine, has been established by its isolation from *Duboisia Hopwoodii*.

In addition to these natural sources, several laboratory methods have been developed for the preparation of nornicotine. Most of these procedures have utilized nicotine as a starting material and the demethylation to nornicotine has been accomplished in either a direct or a stepwise manner. The oxidation of nicotine with potassium permanganate or silver oxide has produced low yields of nornicotine. The reaction of acetic anhydride or benzoic anhydride with nicotine oxide has been reported to yield nornicotine. The demethylation of nicotine to nornicotine has also been accomplished by the reaction of nicotine with bezoic or dihydrocinnamic acids at high temperatures. Nornicotine has also been obtained by the hydrolysis of 1-(3-pyridyl)-1-amino-4-ethoxybutane with concentrated hydrobromic acid.

We have found that nornicotine may be prepared in good yields by a new process involving the reaction of myosmine with hydrogen. The reduction of myosmine to nornicotine is accomplished by reacting a solution of myosmine with hydrogen in the presence of a catalytic agent. Preferred catalysts for the reduction are platinum oxide and palladium oxide or mixtures of these materials.

The reduction of myosmine to nornicotine can be carried out in aqueous or in acetic acid solutions. Although the solvent has some effect on the yield of nornicotine it appears that this is due largely to the effect of the solvent on the hydrogen ion concentration of the solution. Although nornicotine is obtainable over a wide pH range we prefer to carry out the reduction at about pH 6.0 to 9.0.

Since nornicotine is more basic than myosmine the pH of the reaction mixture gradually increases during the conversion of myosmine to nornicotine. Highest yields of nornicotine are obtained when buffers are employed to maintain the pH of the solution within a relatively narrow range. For example, a buffer mixture consisting of one part of citric acid and two parts of disodium hydrogen phosphate dodecahydrate is effective in maintaining an aqueous solution of myosmine at about pH 6.0–9.0 during almost complete reduction to nornicotine. On the other hand, an appreciable decrease in the nornicotine yield may be observed when provisions are not made for control of the hydrogen ion concentration. Furthermore, side reactions occur, yielding undesirable resinous products, when effective buffering agents are not included in the aqueous reaction mixture or when the reduction is carried out in glacial acetic acid.

A convenient laboratory procedure for the reduction of myosmine to nornicotine involves shaking of the reaction mixture at room temperature under an initial hydrogen pressure of about fifty pounds per square inch. The reaction is discontinued when approximately the theoretical quantity of hydrogen has been taken up. In some experiments an excess of hydrogen may be found to be advantageous.

Nornicotine may be isolated from the reaction mixture by several procedures. Steam distillation may be employed to separate the steam volatile products from the non-steam-volatile nornicotine. When appreciable quantities of non-steam-volatile by-products are obtained in the initial reduction it is advantageous to separate nornicotine from these impurities by chromatographic adsorption of the nornicotine on activated alumina. However, when the best conditions for the reduction of myosmine to nornicotine are employed only negligible quantities of undesirable products are formed and it is not necessary to employ either steam distillation or chromatographic adsorption steps in the isolation procedure.

The following isolation method was found to be efficient and adequate in the absence of appreciable quantities of reaction by-products: The reaction mixture is made strongly alkaline, extracted with ether, and the ether solution then extracted with dilute hydrochloric acid. The acid solution is concentrated on a steam bath and then added to a saturated aqueous solution of picric acid. Precipitation of the insoluble alkaloid picrate is essentially complete after several hours. The precipitate is filtered and then recrystallized from water. In a typical example, this recrystallized picrate melted at about 192–193° C. and was identified as nornicotine picrate by a mixed melting point with an authentic sample. Nornicotine was isolated from the picrate by treating the latter with an alkaline solution, extracting the alkaloid with ether, and fractionally distilling the ether extract.

The following examples will further illustrate the nature of our invention:

Example 1

A mixture consisting of 5 g. myosmine, 73.5 g. glacial acetic acid, and 0.2 g. platinum oxide was placed in a pressure bottle connected to a hydrogen cylinder. The hydrogen pressure was increased to 50 pounds per square inch and the bottle was then shaken at room temperature until 0.0765 mole of hydrogen had reacted. More than twice the theoretical amount of hydrogen was allowed to react since it was found that higher yields of nornicotine were thus obtained than when smaller quantities of hydrogen were utilized under these experimental conditions. The reaction mixture was made strongly alkaline, extracted with ether, and the ether solution then extracted with hydrochloric acid. The acid extract was added to an aqueous picric acid solution to precipitate nornicotine picrate. After treatment with norite and recrystallization from water the alkaloid picrate melted at about 192–194° C. By the method of mixed melting points this product was shown to be identical with an authentic sample of nornicotine picrate.

By similar procedures nornicotine picrate was obtained when palladium oxide was employed as a catalyst instead of platinum oxide. A mixed platinum oxide-ceric sulfate catalyst was also effective under these conditions.

Example 2

Glacial acetic acid was added to a solution consisting of 1 g. myosmine, 4.1 g. sodium acetate trihydrate, and 50 g. water until the solution was at about pH 6.0. The catalyst, consisting of 0.045 g. platinum oxide and 0.021 g. palladium oxide was then added and the resulting mixture was reacted with hydrogen as in Example 1 until 0.0124 moles of gas were absorbed. Upon discontinuation of the hydrogenation it was observed that the reaction mixture had increased to pH 8.5. The catalyst was then filtered off and the filtrate added to an aqueous picric acid solution. The precipitated alkaloid picrate was filtered and twice recrystallized from ethyl alcohol. The purified picrate was shown to be identical with an authentic specimen of nornicotine picrate by the method of mixed melting points.

Example 3

A mixture consisting of 2.0 g. myosmine, 50 g. distilled water and 0.1 g. platinum oxide was reacted with 0.0124 mole of hydrogen as in Example 1. The reaction mixture was made strongly alkaline, extracted with ether, and the ether solution then extracted with dilute hydrochloric acid. The acid extract was made alkaline and the solution steam distilled through an efficient fractionating column. Nornicotine was isolated from the steam distillation residue by precipitation of the insoluble picric acid derivative. The identity of this derivative was established as in Example 1.

Example 4

A mixture consisting of 2.0 g. myosmine, 45 g. distilled water, 1.0 g. citric acid monohydrate, and 2.0 g. disodium hydrogen phosphate dodecahydrate was adjusted to pH 6.2 by the addition of aqueous sodium hydroxide solution. One-tenth of a gram of platinum oxide was added and the mixture was then reacted with hydrogen as in Example 1 until 0.014 mole hydrogen were absorbed. After completion of the reduction the reaction mixture was at pH 8.9. The reaction mixture was made strongly alkaline, extracted with ether, and the ether solution then extracted with dilute hydrochloric acid. The acid extract was concentrated on a steam bath and then added to an aqueous picric acid solution. The precipitated alkaloid picrate was filtered and recrystallized from hot water. This purified derivative melted at 192.2°–192.8° C. and was shown to be identical with an authentic sample of nornicotine picrate by the method of mixed melting points.

Under these reaction conditions the quantity of hydrogen absorbed was in excellent agreement with the theoretical amount. The reaction proceeded smoothly with the formation of none of the resinous by-products observed in Examples 1, 2, and 3. The yield obtained under these conditions was about 85 per cent which was appreciably higher than the yields obtained in Examples 1–3 inclusive.

Having thus described our invention, we claim:

1. A process for the manufacture of nornicotine comprising reacting with hydrogen a solution of myosmine buffered with a mixture of acetic acid and sodium acetate to maintain the solution at a pH in the range 6 to 9, and recovering the nornicotine.

2. A process for the manufacture of nornicotine comprising reacting with hydrogen a solution of myosmine buffered with a mixture of acetic acid and sodium acetate in the presence of a catalyst chosen from the group consisting of platinum oxide and palladium oxide and recovering the nornicotine.

3. A process for manufacture of nornicotine in which the starting material is myosmine, comprising reacting the myosmine with hydrogen in the presence of a catalyst chosen from the group consisting of platinum oxide, palladium oxide, and a mixture of platinum oxide and palladium oxide, buffering the reaction mixture during the reduction to nornicotine to maintain it at pH 6 to 9, and recovering the nornicotine from the reaction mixture.

4. The process defined by claim 3 wherein the myosmine solution is maintained within the range of pH 6.0 to 9.0 by the addition of citric acid and disodium hydrogen phosphate.

5. The process defined by claim 3 wherein the myosmine solution is maintained within the range of pH 6.0 to 9.0 by the addition of acetic acid and sodium acetate.

PAUL G. HAINES.
ABNER EISNER.
CHARLES F. WOODWARD.

REFERENCES CITED

The following references are of record in the file of this patent:

Spath, et al., Berichte 71B, pp. 100–106 (1938).
Berichte, vol. 71, 1276–1281 (1938).
Richter-Textbook of Organic Chemistry, pp. 272–273, John Wiley and Sons, New York, N. Y. (1938).
Hodgeman et al., Handbook of Physics & Chemistry, pp. 312–313, 28 edition, (1944).